July 23, 1940.  P. KRUPNIK  2,208,944
PROJECTION APPARATUS
Filed Feb. 26, 1938  3 Sheets-Sheet 1
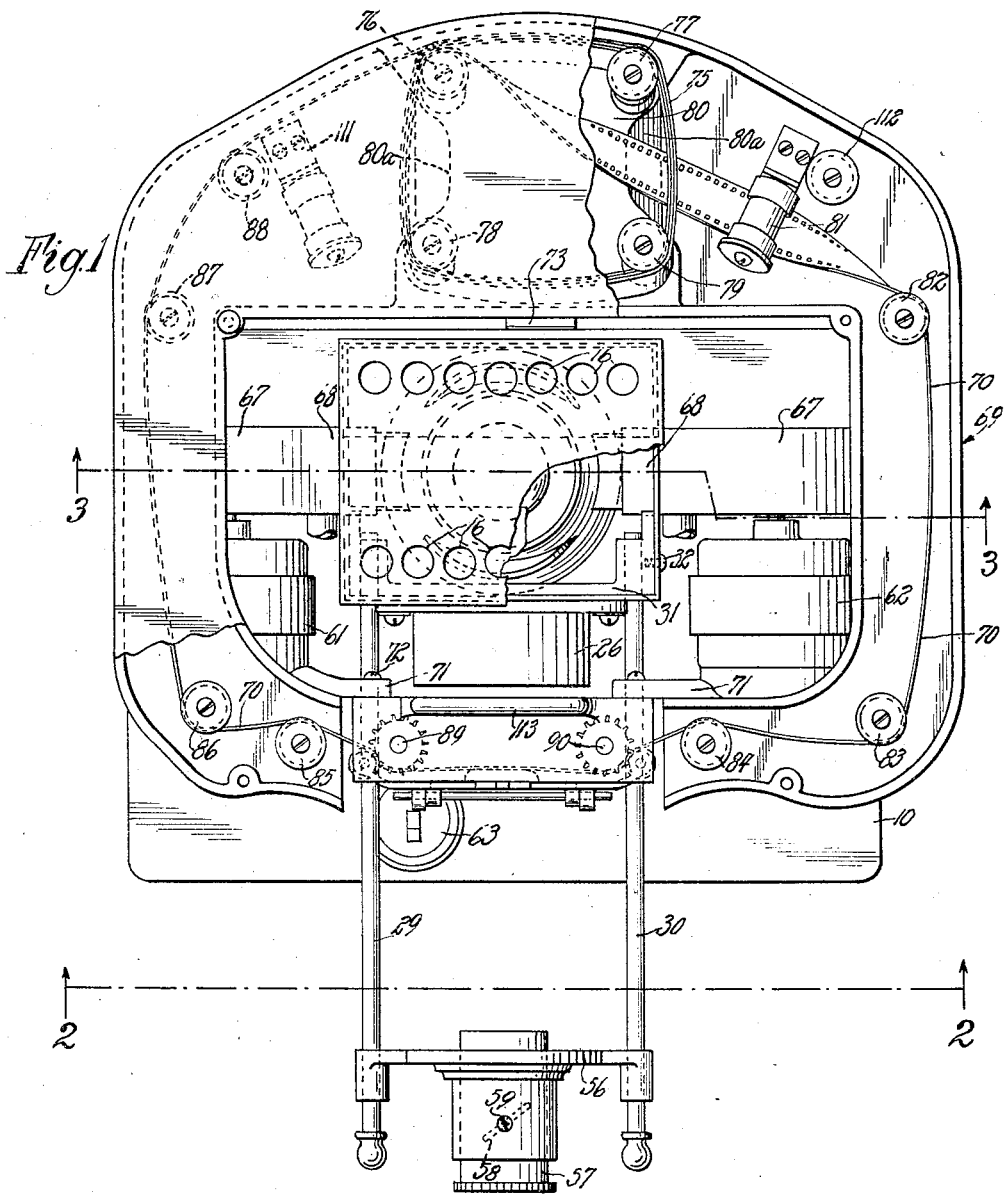
Inventor
Phillip Krupnik
by Henry Plech
Attorney.

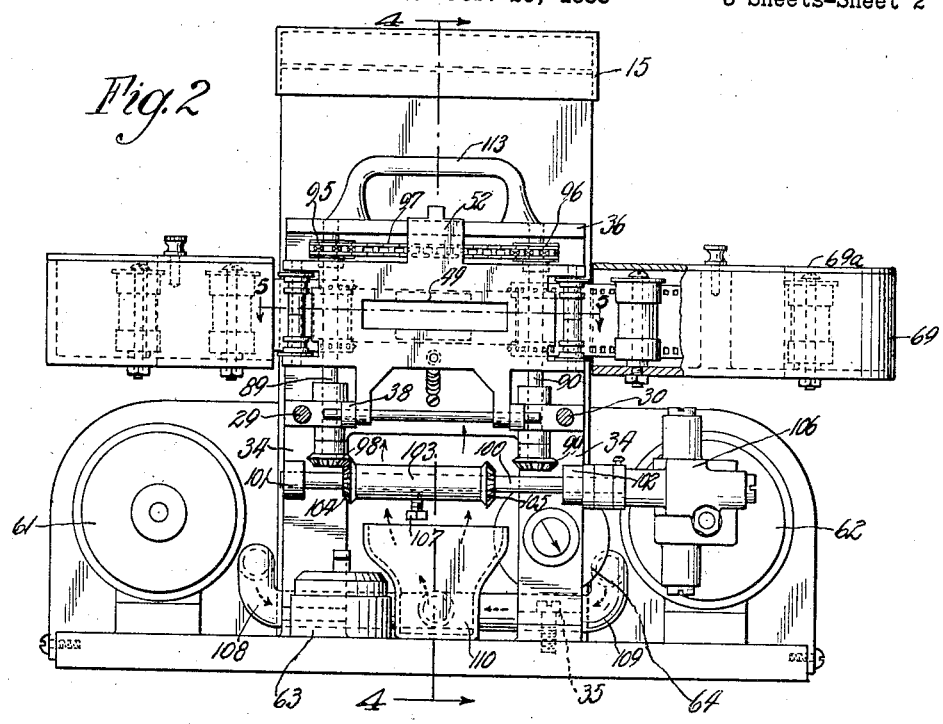
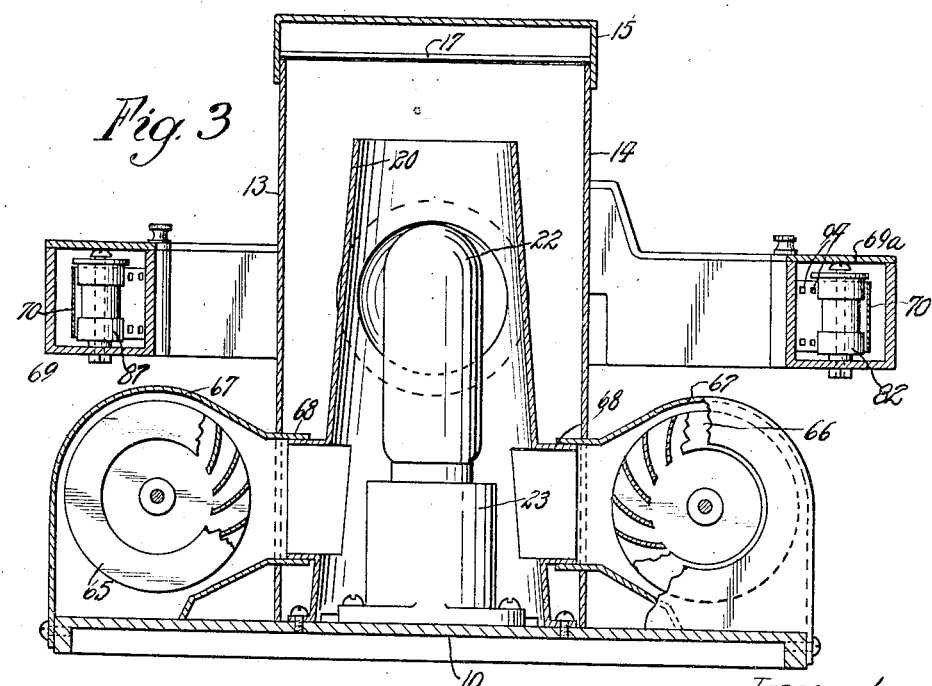

July 23, 1940.　　　　P. KRUPNIK　　　　2,208,944
PROJECTION APPARATUS
Filed Feb. 26, 1938　　　　3 Sheets-Sheet 3
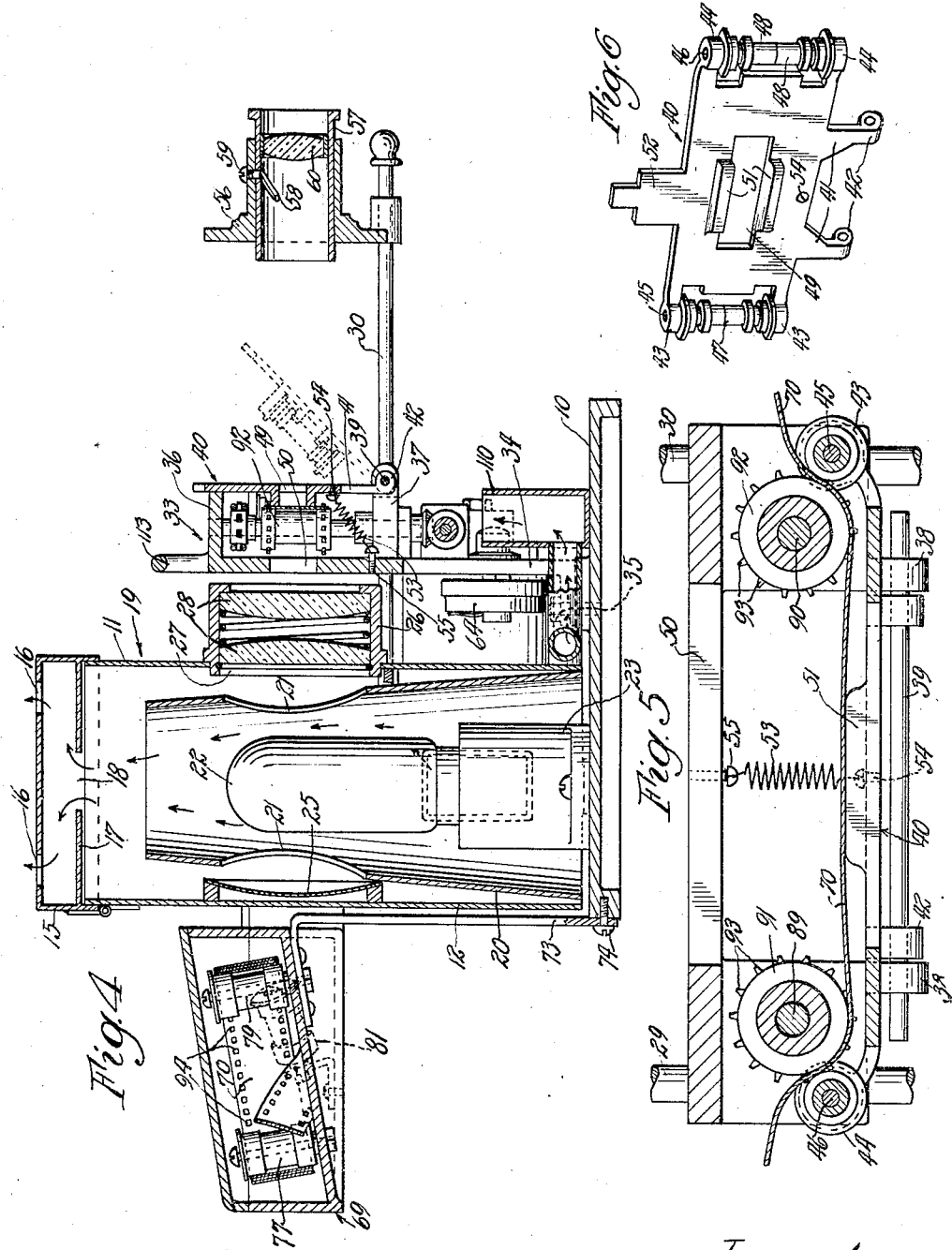
Inventor
Phillip Krupnik
by Henry Flech
Attorney.

Patented July 23, 1940

2,208,944

UNITED STATES PATENT OFFICE 2,208,944

PROJECTION APPARATUS

Phillip Krupnik, Chicago, Ill., assignor to Israel J. London, Laura London, and Burton W. London, all of Detroit, Mich.

Application February 26, 1938, Serial No. 192,756

6 Claims. (Cl. 88—28)

The invention relates to projection apparatus, and particularly to projection apparatus whereby a long film, bearing legends or symbols, is continuously moved across the surface of a screen to exhibit such legends or symbols.

It is an object of the invention to provide an apparatus wherein extremely long films may be used and effectively moved for display purposes.

Another object is the provision of novel film feeding mechanism for efficiently moving the film in either direction.

A still further object constitutes the provision of means for maintaining the portion of the film for projection in taut condition, without damage thereto.

Another object constitutes a superior cooling system for the film and lamp housing.

A still further object is the provision of an air cooling for the film portion through which the light rays pass for projection.

It is also an object of the invention to provide certain details of construction and arrangement tending to enhance the utility and efficiency of a device of the character described.

With these and other equally important objects in view, which will become apparent from a perusal of the invention, the latter comprises the means described in the following specification, particularly pointed out in the claims forming a part thereof, and illustrated in the accompanying drawings, in which:

Fig. 1 is a plan view of a sign projecting apparatus constructed in accordance with my invention.

Fig. 2 is a section on the line 2—2 of Fig. 1.

Fig. 3 is a section on the line 3—3 of Fig. 1.

Fig. 4 is a section on the line 4—4 of Fig. 2.

Fig. 5 is an enlarged section on the line 5—5 of Fig. 2.

Fig. 6 is a perspective view of an auxiliary frame.

Referring to the several views in the drawings, 10 designates a base plate, on which is mounted a casing 19 comprising front and rear walls 11 and 12, respectively, side walls 13 and 14, and a cover 15, hingedly connected to the rear wall 11 and provided with a plurality of holes 16 for the escape of air.

A false bottom 17 in the cover, provided with a central slot 18, acts as a diverter.

A lamp box 20, having aligning openings 21, for the passage of light rays, is provided in the casing and surrounds a lamp 22, mounted in a socket 23, secured to the base plate 10.

A reflector 25 is secured to the rear wall 11, opposite the openings 21, to reflect rays forwardly.

To the front wall 11 is secured, in alignment with the openings 21, a tubular member 26, defining an opening 27 in the front wall and having a pair of condensing lenses 28.

A pair of horizontal rods 29, 30 extend into the casing 19 and are secured therein by extending through a bearing member 31 (Fig. 1) and secured thereto by a set screw 32.

Adjacent the tubular member is a vertical partition, generally designated by 33, having integral standards 34, bent at right angles at the lower end and secured to the base by a screw 35.

The partition has a horizontal flange 36 at the top and aligning horizontal flanges 37 near the bottom, provided with bearing lugs 38, in which is journaled a horizontal rod 39. The flanges 37 have apertures for the passage of the rods 29, 30, respectively.

An auxiliary frame or gate, generally designated by 40, is pivotally secured to the rod 39 by lugs 38, having apertured trunnions 42, in which the rod 39 is received.

The auxiliary frame 40, at each side, is recessed and provided with vertically aligning bearings 43 and 44, in which is received shafts 45 and 46, respectively, carrying rollers 47 and 48, respectively.

The auxiliary frame is provided with a longitudinal slot 49 which is in alignment with a slot 50 in the partition 33, whereby the light rays emanating from the lamp 22 may pass without obstruction.

Lugs 51, just above and below the slot 49, are provided for a purpose hereinafter referred to.

The auxiliary frame has a lug 52, extending upwardly from the top and adapted to engage the partition flange 36 under the influence of a spring 53, secured at one end to the auxiliary frame 40, as at 54, while its other end is anchored to a screw 55, projecting from the partition 33.

Slidably mounted on the rods 29, 30 is a carriage 56 in which is adjustably held a tube 57 having a cam slot 58, receiving the end of a set screw 59 and provided with a projecting lens 60.

On the base plate 10 are mounted electric motors 61 and 62, which drive the film moving mechanism, there being a switch 63 for turning on and off the motors, as well as a rheostat control 64, for controlling the speed of the motors.

The motors 61 and 62 drive, respectively, fan blowers 65 and 66 (Fig. 3) mounted in housings 67, whence a duct 68 leads through the central casing 19 and enters the lamp box 20 to cause currents of cool air to pass along the lamp 22, and escape upwardly through the holes in the cover, provided for that purpose.

The casing 19 is surrounded by a housing generally designated by 69, adapted to enclose a character bearing element or film 70, which is made of the same material as motion picture films, and constructed as an endless band.

The housing 69, at the forward end, has integral lugs 71, which engage the rear of the partition 33, and are secured thereto by a screw 72.

The rear portion of the housing is supported on a standard 73, secured at the lower end, to the base plate 10, by a screw 74.

The housing 69 is formed at the front and sides as a U-shaped trough, but, at the rear, is widened to permit the film to be wound in a series of loops 75 around four rollers 76, 77, 78 and 79, which are mounted on a raised bottom portion 80, sloping rearwardly and downwardly, and the innermost layer of the loops 75 is drawn underneath the loops and passes under a roller 81, arranged in slanting position to reach a roller 82. The loops are in nested relation and in engagement with one another.

The film then proceeds past rollers 83 and 84, past a film feeding device presently to be described, to rollers 85 and 86, reaching rollers 87 and 88 to form the loops 75. The housing is closed by a cover 69a releasably secured thereto, in any approved or convenient manner.

The film feeding device includes vertical shafts 89 and 90, journaled in the flanges 36 and flanges 37, each carrying a pair of sprockets 91 and 92, respectively, having teeth 93, which engage apertures 94 of the film, to positively feed the same as hereinafter further described.

The shafts 89 and 90 are also provided at the top with sprocket wheels 95 and 96, around which a chain 97 is trained, so that irrespective of whether shaft 89 or 90 receives the drive, the non-driven shaft is positively driven by the chain 97. At the lower end of the shafts 89 and 90 are bevel gears 98 and 99, respectively.

A horizontal shaft 100 is journaled in bearings 101 and 102, provided on the partition standards 34, and has slidably mounted thereon a sleeve 103, provided with bevel gears 104 and 105, which are adapted to be placed in mesh with bevel gears 98 and 99, respectively, so that the film may be driven toward the left or right.

The shaft 100 is connected by a reduction gearing 106, to the motor 62, to be driven thereby.

It is evident that when, as shown in Fig. 2, the sleeve 103 is in the extreme left position, and secured by a set screw 107, drive is imparted to the shaft 89. The shaft 90 and its sprockets 92 do not idle, however, since the chain 97 drives the shaft 90, so that positive feeding of the film is obtained by both pairs of sprockets 91 and 92.

From the housings 67 lead ducts 108 and 109, to a distributor head 110, located on the base plate 10 just in front of the partition 33, so as to permit air to reach the film in the feeding mechanism, to maintain the same in cool condition.

Attention is called to the fact that that portion of the film, stretched between the sprockets 91 and 92, is held in taut condition by the lugs 51 of the gate 39, which are held in resilient engagement with the film by the provision of the spring 53, so that the film remains taut, without any possible injury thereto.

It is obvious that the device is properly cooled by the provision of the two blowers 65, 66, which draw cold air from the atmosphere and circulate the same through the casing and past the film portion, which is held taut for projection.

The film housing 69 has additional rollers 111 and 112, which may be used instead of the rollers 81 and 88, in the event the loops are to be formed from the right instead of the left, as viewed in Fig. 1.

The raised portion 80 is recessed, as at 80a, to permit the innermost layer to pass freely under the nested loops.

The partition 33 is provided with a handle 113, to facilitate handling of the device.

The film moving mechanism is designed to obtain efficient movement of the film and to this end the lug 52 of the auxiliary frame engages the flange 36 of the frame 33, whereby the rollers 47, 48 are always maintained at a proper distance from the sprockets to obviate pressure on the film.

While the drawings show a preferred embodiment of the invention, numerous changes, alterations and revisions may be made without departing from the spirit of the invention.

I, therefore, do not limit myself to the details of construction, as shown, but wish to include all modifications, revisions and changes, constituting departures within the scope of the invention, as defined in the appended claims.

I claim:

1. In a projecting apparatus, a film moving mechanism for conveying a film past a projecting aperture, comprising a frame having upper and lower horizontal flanges, a pair of vertical shafts journaled in said flanges and carrying sprockets engaging the film, an auxiliary frame provided with rollers and hinged to said lower horizontal flanges, said auxiliary frame having a projecting aperture, and resilient means urging said auxiliary frame into position to cause its rollers to cooperate with said sprockets in moving said film.

2. In a projecting apparatus, a film moving mechanism for conveying a film past a projecting aperture and comprising an upright frame having an upper and lower horizontal flange and provided with a projecting aperture, a pair of vertical shafts journaled in said flanges and carrying sprockets engaging the film, a horizontal shaft journaled in bearings on said frame, means for selectively gearing said horizontal shaft to one of said pair of vertical shafts, and means for imparting drive from said geared vertical shaft to the ungeared vertical shaft.

3. In a projecting apparatus, a film moving mechanism for conveying a film past a projecting aperture and comprising an upright frame having an upper and lower horizontal flange, said frame having a projecting aperture, a pair of vertical shafts journaled in said flanges and carrying sprockets engaging the film, a horizontal shaft journaled in bearings on said frame below said vertical shafts, means for selectively gearing said horizontal shaft to one of said pair of vertical shafts, and a driving chain trained around the upper ends of said vertical shafts.

4. In a projecting apparatus, a film moving mechanism for conveying a film past a projecting aperture and comprising an upright frame having an upper and lower horizontal flange, a pair of vertical shafts journaled in said flanges and carrying sprockets engaging the film, a horizontal shaft journaled in bearings on said frame, means for selectively gearing said horizontal shaft to one of said pair of vertical shafts, an auxiliary frame hingedly connected to said lower horizontal flange and carrying rollers to cooperate with sprockets, said auxiliary frame being provided with a projecting aperture, and means for urging said auxiliary frame toward said upright frame.

5. In a projecting apparatus, a film moving mechanism for conveying a film past a projecting aperture and comprising an upright frame having an upper and lower horizontal flange, a pair of vertical shafts journaled in said flanges and carrying sprockets engaging the film, a horizontal shaft journaled in bearings on said frame, means for selectively gearing said horizontal shaft to one of said pair of vertical shafts, an auxiliary frame hingedly connected to said frame and carrying rollers to cooperate with said sprockets, said auxiliary frame being provided with a projecting aperture, means for urging said auxiliary toward said upright frame, and means for maintaining said rollers at a predetermined distance from said sprockets.

6. In a projecting apparatus, a film feeding device for conveying a film past a projecting aperture including a support, sprocket rollers on said support for indexing said film, an apertured plate pivotally secured to said support provided with a projecting aperture and having rollers cooperating with said sprockets in guiding the film, said plate having lugs engaging the film intermediate said sprocket wheels to maintain it in taut condition, and means for limiting the extent to which said rollers approach said sprockets to prevent pressure on the film.

PHILLIP KRUPNIK.